US005967174A

United States Patent [19]

MacDonald

[11] Patent Number: 5,967,174

[45] Date of Patent: Oct. 19, 1999

[54] SPILL CONTAINMENT SYSTEM

[76] Inventor: William David MacDonald, 2687 N. 700, W. Andrews, Ind. 46702

[21] Appl. No.: 09/114,082

[22] Filed: Jul. 10, 1998

[51] Int. Cl.[6] .............................. B67D 5/04; F16K 51/00; F16L 37/18

[52] U.S. Cl. ........................... 137/312; 141/86; 141/231; 285/1; 285/312

[58] Field of Search ............................ 141/86, 387, 231; 222/108, 608; 137/312, 364; 285/312, 313, 341, 305, 1, 2, 304

[56] References Cited

U.S. PATENT DOCUMENTS

| | | | |
|---|---|---|---|
| 3,314,698 | 4/1967 | Owens | 285/312 |
| 3,633,948 | 1/1972 | Dickey | 285/312 |
| 4,059,296 | 11/1977 | Panourgias | 285/312 |
| 4,278,115 | 7/1981 | Briles et al. | 137/312 |
| 4,457,349 | 7/1984 | Vazin | 137/312 |
| 4,842,443 | 6/1989 | Argandona | 137/312 |
| 5,005,876 | 4/1991 | Fahl | 285/312 |
| 5,099,872 | 3/1992 | Tarvin et al. | 222/108 |
| 5,341,857 | 8/1994 | Bravo | 137/312 |
| 5,368,343 | 11/1994 | Allen | 285/312 |
| 5,529,098 | 6/1996 | Bravo | 137/312 |
| 5,595,368 | 1/1997 | Bogdany et al. | 285/312 |

*Primary Examiner*—George L. Walton
*Attorney, Agent, or Firm*—Paul W. O'Malley; Susan L. Firestone

[57] ABSTRACT

The patent discloses apparatus for removing and containing spills occurring upon filling of a delivery tank truck. The spill catching basin and more particularly the drains mounted to the tops of tanks are modified to deliver liquid spilled into the basin to a single outlet along the side of the truck. A receptacle, such as a buried tank is provided to receive the runoff from the truck. Provided for connection to the outlet is a fitting which may be releasably clamped to the outside of the outlet. The fitting is coupled to the buried tank by a flexible hose and a slip coupling between the hose and the fitting.

4 Claims, 2 Drawing Sheets

SPILL CONTAINMENT SYSTEM

BACKGROUND OF THE INVENTION

The present invention is directed to the containment and recovery of spills of liquid fuels and more particularly to a system and method of containing fuels spilled while filling tank trucks at bulk plants.

Fuel distributors operate numerous small bulk fuel distribution plants throughout North America. These distributors use tank trucks, some of less than contemporary vintage, to deliver fuel to consumers. The quick loading of these tank trucks contributes to the efficient operation of the plant. However, the efficiency gains stemming from quick turnaround of trucks can be just as quickly offset by spills of fuel. While the avoidance of spills is always preferable, and the more usual focus of the art, the handling of spills in the least costly and most efficient manner is a useful backup to methods and apparatus directed to avoiding the spill in the first place.

In the experience of the present inventor, many bulk fuel distribution plants contain spills by discharging excess fuel to a catch basin. Delivery trucks are frequently constructed with an inverted skirt on top of the tank surrounding the inlet to the tank. Pipes disposed at the forward corners of the tank drain the basin formed by the inverted skirt into a catch basin constructed at ground level and over which the delivery truck is parked during filling, or, less desirably, discharge the fuel directly onto the ground. In either case, time consuming clean up of the fuel is required, preferably before evaporation results in noxious fumes being released into the air or produces a fire hazard.

In the interest of economy, and reduced environmental and fire risk, it would be preferable for liquid fuel spills be quickly removed and contained out of the air and away from the truck which was the source of the spill. In operation, a fuel removal and containment mechanism should: involve minimal effort to use; not detract from the efficient operation of the bulk distribution plant; be tolerant of user error by minimizing unintended consequences stemming from misuse of the apparatus; have a minimum number of moving parts so that the apparatus itself does not become a nuisance and to minimize the required maintenance; and not be a spark source.

SUMMARY OF THE INVENTION

The present invention provides an apparatus for removing and containing spills occurring upon filling of a delivery tank truck. A spill catching basin disposed on top of the truck's tank, and more particularly drains connected into the basin are modified to deliver liquid spilled into the basin to a discharge outlet along the side of the truck. A receptacle, such as a buried tank or recovery reservoir, is provided to receive the liquid channeled through the drains. A quick release fitting is provided for connection to the discharge outlet which may be releasably clamped around the outside of the discharge outlet. The fitting is coupled to the buried tank by a flexible hose and a slip or breakaway coupling between the hose and the fitting.

Additional effects, features and advantages will be apparent in the written description that follows.

DETAILED DESCRIPTION OF THE INVENTION

Figure 1:
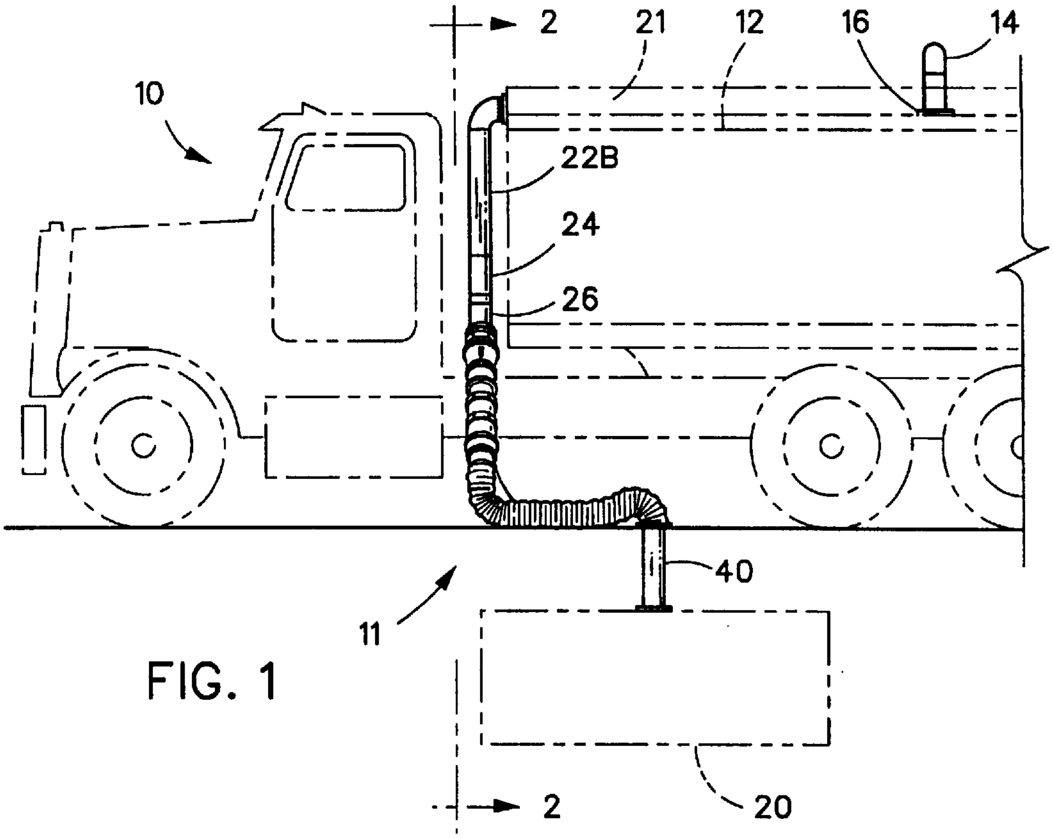
FIG. 1 is a side elevation of a delivery tank truck on which the invention is mounted.

With reference now to the figures, and in particular with reference to FIG. 1, there is depicted a bulk liquid spill containment system 11 in accord with the present invention. The containment system 11 is illustrated partially mounted on a conventional fuel delivery truck 10 and tank 12. System 11 works to divert spills occurring as fuel is introduced to tank 12 from a boom supported pipe 14 through an inlet 16 disposed on the top of a tank 12 to a recovery reservoir 20.

Inlet 16 on top of tank 12 is surrounded by an inverted skirt 18 which, with the top of tank 12, forms an open basin 21 for catching spills. Drain pipes 22A (shown in FIG. 2) and 22B are disposed along one end of tank 12 and communicate with open basin 21 to drain liquid spilled into open basin 21. The disposition of a basin 21 and drain pipes 22A and 22B on a tank carried by a delivery truck 10 is part of the prior art.

Figure 2:
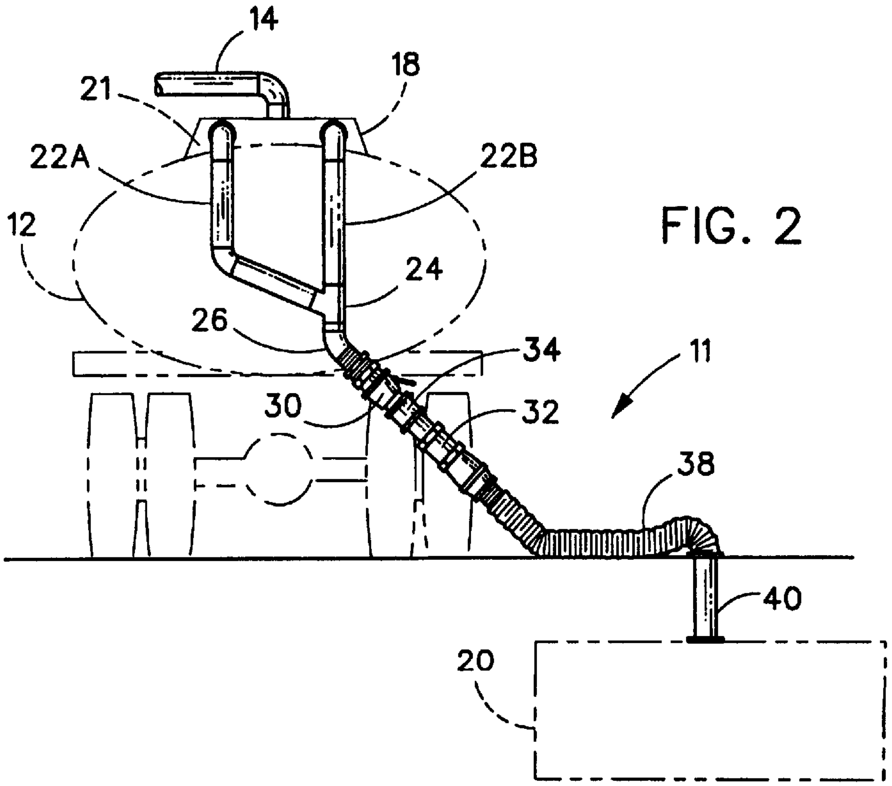
FIG. 2 is a section view of the delivery tank truck of FIG. 1 taken along section lines 2—2.

Referring now to FIG. 2, liquid containment system 11 includes a T-connection 24 connected to the lower ends of drain pipes 22A and 22B to collect any fluid flow from the drain pipes into a single path and to deliver the flow through a drain segment 26 which has a discharge along one side of the truck 10. Drain segment 26 is releasably connected by a quick-release or cam lock fitting 30, a step down fitting 34, a Dresser coupling 32, flexible hose 38 and inlet pipe 40 to the recovery reservoir 20. Drain segment 26 and cam-lock fitting 30 can be readily detached from one another allowing truck 10 to be moved.

Figure 3A:
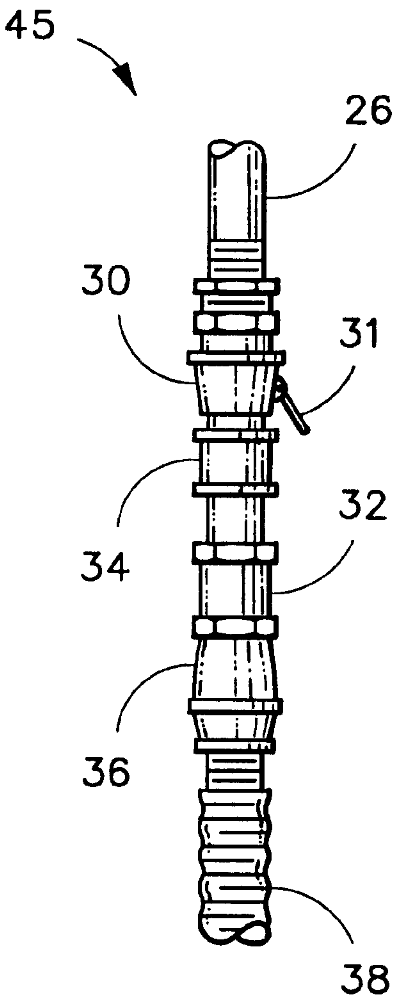
FIGS. 3A and 3B are greatly expanded views of an adaptor used to implement the invention.
Figure 3B:
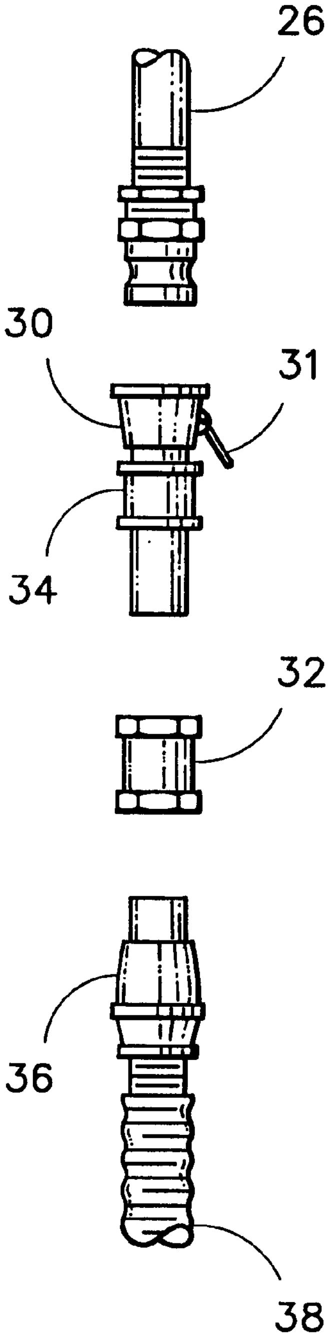

Referring now to FIGS. 3A and 3B, an adaptor assembly 45 constructed of a series of pipes and fittings for containment system 11 is illustrated, both as assembled and in an exploded view. Ease of use of containment system 11 is aided by providing for the quick connection and release of the components permanently connected to recovery tank 20 and discharge outlet 28. Such quick connection and release is afforded by cam-lock fitting 30, which is actuated by a lever 31. The end of cam-lock fitting 30 providing for releasable connection fits readily around discharge outlet 28 from drain segment 26. Discharge outlet 28 may grooved to allow a secure connection between the cam-lock fitting and the outlet. Drain segment 26 may be constructed to swivel back and forth. Then, if the truck 10 is moved without first disconnecting the cam-lock fitting 30, segment 26 will turn with rather than twist in fitting 30 and the fitting will be pulled longitudinally from Dresser coupling 32.

A step fitting 34 may be used if required to connect cam-lock fitting 30 to a Dresser coupling 32. Dresser coupling 32 in turn is connected to flexible hose 38 by another step fitting 36. Dresser coupling 32, or another breakaway fitting responsive to longitudinal force for separating, provides protection for the equipment against a driver moving truck 10 without first releasing cam-lock fitting 30 from outlet 28. A pipe end fitted into a Dresser coupling 32 with the coupling tightened down on the pipe end provides a connection which can be pulled apart by sufficient axial force, generally more than would be expected in normal usage. Step fitting 34 may be withdrawn from coupling 32, as illustrated, or, alternatively, fitting 36 may be withdrawn from coupling 32. Where components have been separated from Dresser coupling 32, adaptor assembly 45 may be reassembled by loosening the Dresser coupling 32 at the end the fitting was pulled from, reinserting the fitting and then retightening the Dresser coupling.

The invention provides an economical apparatus for reducing the environmental and fire risk from fuel spills by providing for the quick removal of the fuel spill out of the open air and away from the source of the spill. Operation of the invention involves minimal efforts to implement, allows the continued efficient operation of the bulk distribution plant, and is tolerant of user error by minimizing unintended consequences stemming from misuse of the apparatus. There are a minimum number of moving parts so that the apparatus does not require substantial maintenance.

While the invention is shown in only one of its forms, it is not thus limited but is susceptible to various changes and modifications without departing from the spirit and scope of the invention.

What is claimed is:

1. A spill containment system providing collection and diversion of liquid spilled around inlets to a tank mounted on a delivery truck, comprising:

a open collection basin disposed on top of the tank and formed by the top of the tank and an inverted skirt resting on top of the tank and surrounding the inlets;

first and second drain pipes passing through an end of the inverted skirt from adjacent the opposite sides of the open collection basin and down along one end of the tank;

a connector connected to lower ends of the first and second drain pipes and having a discharge positioned along one side of the delivery truck;

a receiving tank positioned off the delivery truck and accessible by a receiving conduit; and an adaptor assembly including a breakaway fitting for coupling fluid flow from the discharge of the connector to the receiving tank.

2. A spill containment system as set forth in claim 1, wherein the adaptor assembly further comprises:

a transfer assembly allowing attachment to the discharge from the connector;

a flexible hose connected to the receiving tank;

the breakaway fitting comprising a slippable clamp fitting connectable to the transfer assembly; and a releasable fitting between the clamp fitting and the flexible hose.

3. Apparatus as described in claim 2, wherein the slippable clamp is a dresser coupling.

4. An overflow protection system for delivery truck mounted tanks, comprising:

an inverted skirt disposed on the tank forming with the top of the tank an open basin surrounding at least a first inlet on top of the tank;

at least first and second drain conduits connected into the open basin through the inverted skirt;

a first hose connected to the distal end of the first drain conduit;

a second hose connected to the distal end of the second drain conduit;

a joint connecting the first and second hoses;

a discharge drain from the joint directed to one side of the delivery truck;

a receiving tank;

a flexible feed hose connected to the receiving tank;

a releasable, clamping adaptor for connection to the drain hose; and a slip coupling responsive to moderate longitudinal force for separating, fitted between the releasable, clamping adaptor and the flexible feed hose.

* * * * *